C. MECKLEM.
SCORE CARD.
APPLICATION FILED APR. 22, 1903. RENEWED JAN. 5, 1912.
1,019,070.
Patented Mar. 5, 1912.
2 SHEETS—SHEET 1.
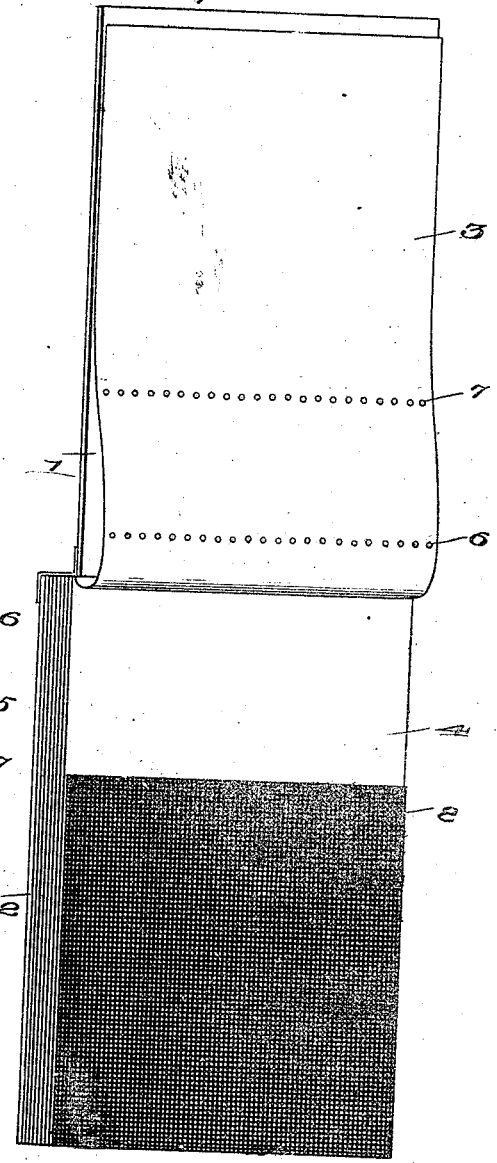

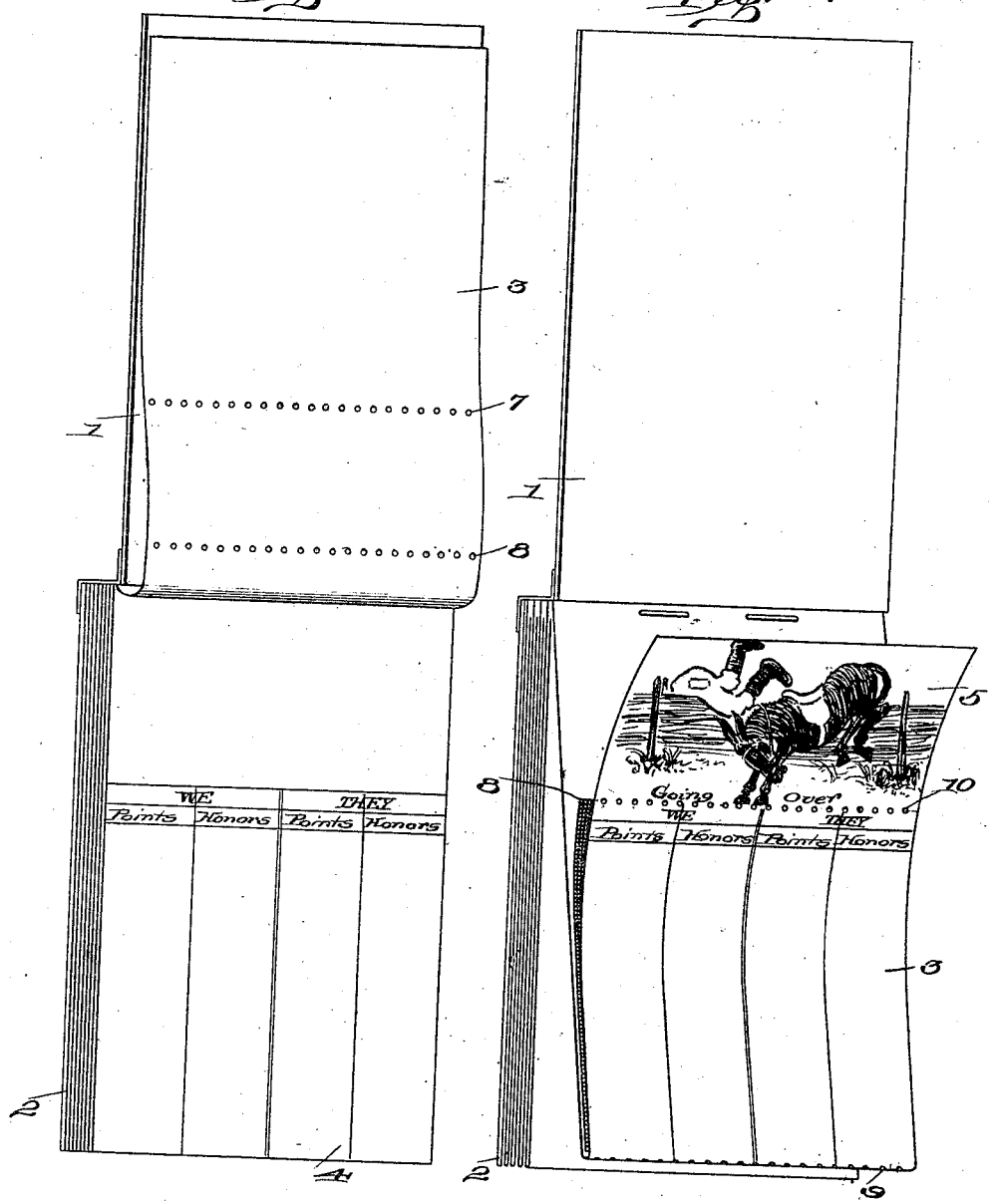

UNITED STATES PATENT OFFICE.

CLIVE MECKLEM, OF NEW YORK, N. Y., ASSIGNOR TO BRENTANO'S, OF NEW YORK, N. Y. A CORPORATION OF NEW YORK.

SCORE-CARD.

1,019,070.     Specification of Letters Patent.     Patented Mar. 5, 1912.

Application filed April 22, 1903, Serial No. 153,753. Renewed January 5, 1912. Serial No. 669,717.

*To all whom it may concern:*

Be it known that I, CLIVE MECKLEM, residing at New York, in the county of New York and State of New York, have invented certain new and useful Improvements in Score-Cards, of which the following is a full, clear, and exact description, such as will enable others skilled in the art to which it appertains to make and use the same.

This invention relates to a score card book, especially designed for use in scoring bridge, but obviously adapted as to certain features thereof for use in a variety of games.

The invention consists in the features of construction, combinations of elements and arrangement of parts which will be hereinafter more fully described and the novel features thereof pointed out in the claim.

In the accompanying drawings, Figure 1 is a view showing the book with the cover thrown back. Fig. 2 is a view showing the cover and the first sheet thrown back and showing a loose-leaf carbon in position on the second sheet. Fig. 3 shows a similar view with the carbon removed. Fig. 4 shows a modified form of book.

Similar reference characters refer to similar parts throughout the several views.

Referring first to Figs. 1, 2 and 3, the book comprises suitable front and back covers 1 and 2, the front cover having its inner face, as shown, being provided with rules, indications or instructions relating to the game—in the present instance, that of bridge—or to whatever game the book is intended to accompany. Such rules upon the cover, while not essential, are preferably associated with the other features of the invention and are a convenient and desirable part thereof. The upper page of each sheet, as shown on Figs. 1 and 2, is ruled or marked off in any desired way so as to present an outline convenient for the arrangement of a game score. The preferred manner of ruling, however, is substantially that shown, having separate columns for the recording of the scores of two or more contesting parties, each subdivided for the record of points acquired in a plurality of ways, as, for example, those gained in the ordinary course of the game and those resulting from the holding of honors. The first page of the book, as page 3, and alternate pages thereafter, are provided with illustrations, as shown at the upper end of page 3 at 5, which may be comic illustrations referring to some feature of the game, or which may be of any desired character, instructive or otherwise. The illustrated sheets are preferably perforated both above and below the illustrations, as on lines 6, 7, so that a sheet with the illustration may be removed or the score may be removed, leaving the illustration in the book. If desired, all the pages of the book may be provided with illustrations. I prefer, however, a book as shown, wherein the alternate pages beginning with the top are provided with illustrations and serve as originals, while the intermediate sheets 4 are simply ruled and serve as duplicates on which the impression from the original may be preserved, as by means of a loose leaf or other carbon 8 inserted therebetween.

In Fig. 4 is illustrated a modification wherein the book is made up of sheets in pairs, formed by folding a long sheet in the middle and binding it at one end only so that the first sheet of each pair is loose at its upper end and forms an original, the carbon, as 8, being slipped between the original and duplicate where it is desired to retain a duplicate impression. In this modification each original sheet would be provided with a picture at its upper end, as shown, and there would be a line of perforations at the fold 9 so that the originals with their illustrations could be removed, leaving the duplicates or carbon copies in the book. If desired, each sheet could also be perforated on a line directly below the illustration, as shown at 10.

It will be seen that I have provided a score book which has a cover upon which are conveniently arranged instructions relating to the game, and which provides both original and duplicate sheets for the preservation of the score, and in connection with which there are also provided illustrations providing amusement and instruction for the players, and which are also adapted to be removed from the book in connection with the score. Thus, at the end of an evening's play, the illustrated sheets could be removed and distributed among the players as records and souvenirs, while the duplicates would remain in the book as a complete, bound record. Further advantages of the invention will be obvious without need of elaboration.

Having described my invention, what I claim as new and desire to secure by Letters Patent is:—

A score book comprising a plurality of tally sheets connected together at one end to form said book, each sheet consisting of an original and a duplicate leaf connected and folded together at their outer ends along a score line whereby said leaves may be readily severed from one another, said original leaf terminating short of said duplicate leaf and having a transverse score line to permit said leaf to be severed therealong and thereby divided into a relatively short and a relatively long portion, the former being provided with an illustration characteristic of a term of a game, and the latter portion being divided into a series of columns provided with legends qualifying the use of the columns whereby scorings may be properly entered.

In testimony whereof I affix my signature, in the presence of two witnesses.

CLIVE MECKLEM.

Witnesses:
H. M. SEAMANS,
J. B. KNOX.